United States Patent [19]

Hennenfent

[11] 4,233,940
[45] Nov. 18, 1980

[54] LIVESTOCK FARROWING APPARATUS

[76] Inventor: Rex E. Hennenfent, 1270 Arrowhead Dr., Dubuque, Iowa 52001

[21] Appl. No.: 126

[22] Filed: Jan. 2, 1979

[51] Int. Cl.³ .............................................. A01K 1/02
[52] U.S. Cl. ..................................................... 119/20
[58] Field of Search ....................... 119/15, 16, 20, 74

[56] References Cited

U.S. PATENT DOCUMENTS

| 633,508 | 9/1899 | Fansher | 119/74 |
|---|---|---|---|
| 1,176,193 | 3/1916 | Bedell | 119/74 |
| 1,764,151 | 6/1930 | Cosper | 119/16 |
| 3,237,600 | 3/1966 | Behrens et al. | 119/20 |
| 3,276,567 | 10/1966 | Hartman | 119/52 AF X |
| 4,006,715 | 2/1977 | Redmon et al. | 119/20 |

*Primary Examiner*—Louis G. Mancene
*Assistant Examiner*—Robert P. Swiatek
*Attorney, Agent, or Firm*—Zarley, McKee, Thomte, Voorhees & Sease

[57] ABSTRACT

A rectangular farrowing crate is provided with an elongated hollow feed tube arranged with its open upper end adjacent the rearward end of the crate and its lower end in communication with a feed trough situated adjacent the forward end of the crate whereby feed deposited in the upper end of the feed tube will move by gravity to the feed trough. A plurality of crates may be arranged inside a hog farrowing building in side-by-side relationship with their respective forward ends in substantial abutting relation to one of the sidewalls of the building with an aisle way extending through the building transverse to the crates and along the rearward ends of thereof.

12 Claims, 7 Drawing Figures

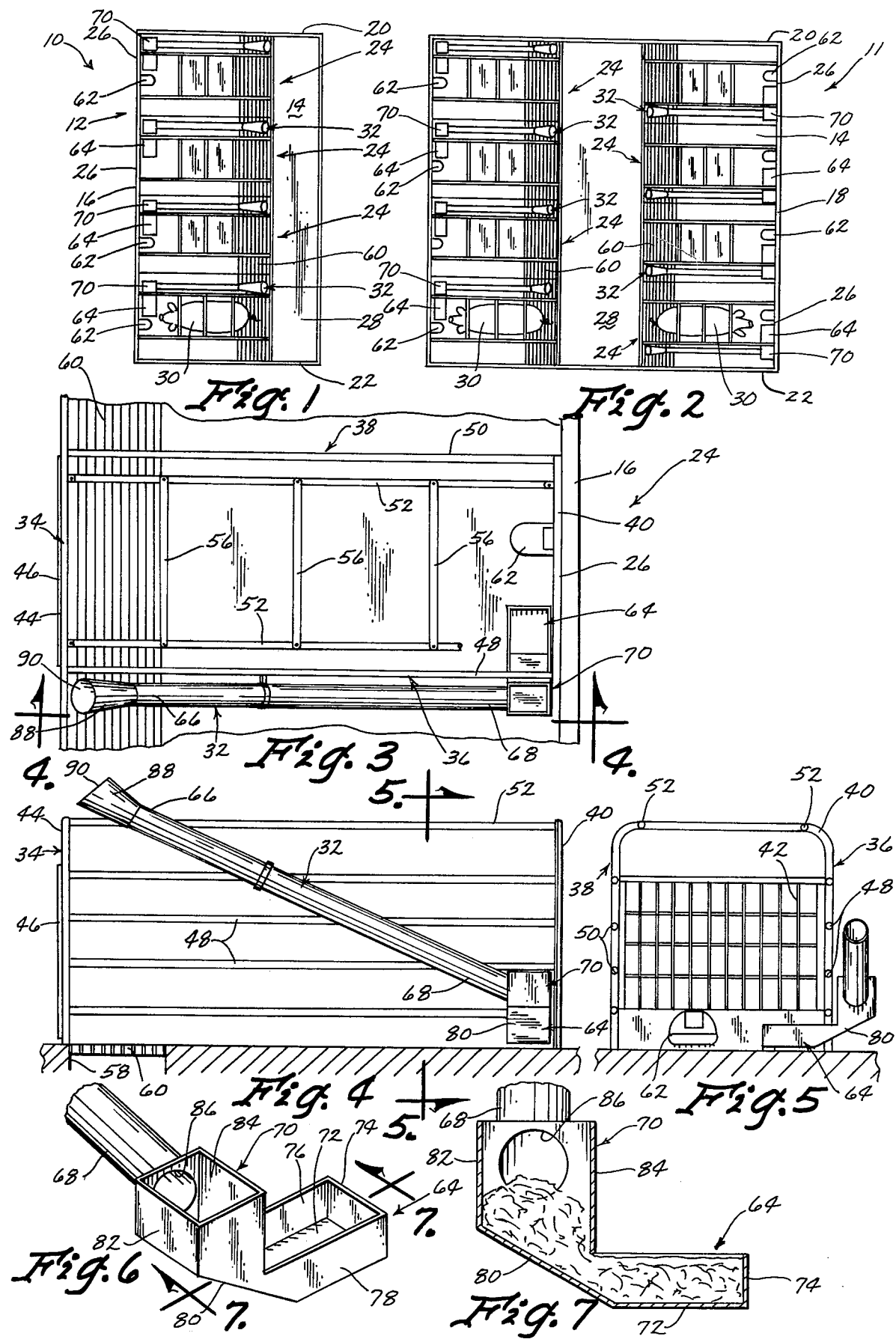

LIVESTOCK FARROWING APPARATUS

BACKGROUND OF THE INVENTION

This invention is directed generally to livestock farrowing apparatus and more particulary to an improved farrowing crate construction and arrangement whereby access to only a single end of the crates is required.

In a typical modern hog farrowing house, the farrowing crates or stalls are arranged in one or more rows having an access aisle along each side for access to both ends of the crates. The aisle at the rearward end of the crates is used for leading the sows into and out of the crates and the aisle at the forward ends is used to feed and water the sows. In such buildings, the sows are generally kept within the crates for three or four weeks after the small pigs are farrowed.

In buildings where the farrowing crates abut against one of the building sidewalls, the feed troughs are generally situated adjacent the sidewall to provide access for the sows to enter and leave the opposite end of the crate. In such arrangements, it is very inconvenient if not impossible to get feed into the feeding troughs when the sows are in the crates. As a result, the sows are ordinarily let out each day while the feeding and watering chores are performed.

Accordingly, there is a need for a farrowing crate adapted to be positioned against a building sidewall for purposes of space efficiency and yet provide ready access to the feeding troughs adjacent the sidewall so that the sows may be conveniently fed while being kept within the crates.

Therefore, it is a primary object of the invention to provide an improved farrowing crate.

A further object is a farrowing crate having a feed trough adjacent its forward end in communication with a feed tube on one side of the crate so that feed deposited into the feed tube at the rearward end of the crate is delivered to the feed trough.

A further object is to provide such a farrowing crate wherein the feed tube is inclined downwardly and forwardly toward the feed trough so that feed is moved by gravity through the feed tube.

A further object is to provide a farrowing crate which may be conveniently serviced both for feeding and cleaning with access to only one end.

A related object is to provide a hog farrowing building wherein the crates are arranged in substantially abutting relationship to the building sidewalls and yet which are conveniently accessible for feeding purposes with the sows enclosed therein.

Another object is to provide a hog farrowing building which is space efficient.

Finally, a further object is to provide a farrowing crate which is economical to manufacture, simple in construction and practical in operation.

SUMMARY OF THE INVENTION

A hog farrowing crate has forward and rearward ends and opposite sides, an elongated hollow feed tube on one side thereof which extends from an upper end adjacent the rearward end of the crate to a lower end adjacent the forward end of the crate and a feed trough adjacent the forward end of the crate in communication with the lower end of the feed tube so that feed deposited in the upper end of the feed tube will move by gravity to the feed trough. Since the feed tubes enable the crates to be serviced for feeding purposes from the rearward ends through which the hogs are introduced into the crates, it is practical to service the crates for both feeding and cleaning from only the rearward ends.

The present invention also contemplates a hog farrowing building having a floor, sidewalls and end walls with a plurality of crates resting on the floor in side-by-side relationship with their respective forward ends in substantial abutting relation to one of the building sidewalls. An aisle is provided along the rearward ends of the crates both for leading sows into and out of the building and for access to the open upper ends of the feed tubes. Accordingly, the usual aisle at the forward ends of the crates may be eliminated with the result that a smaller building may be utilized for housing a given number of sows. Alternatively, existing buildings which are converted to the arrangement of the invention will accommodate an increased number of sows in the same space.

The advantages of space efficiency provided by the present invention are not limited to a maximum utilization of floor space. Since access to the forward ends of the crates is not required, the buildings may be provided with low eaves on the outside walls since there is no longer any need for sufficient height to accommodate a man walking in an aisle along the outside wall. Accordingly, the present invention permits the roof line to be lowered with resultant savings in both materials and heating costs.

Servicing crates constructed and arranged according to the present invention is substantially simplified because both feeding and cleaning may be done from the same end of the crate without walking back and forth between the opposite ends.

BRIEF DESCRIPTION OF THE DRAWINGS

FIG. 1 is a top plan view of a hog farrowing building according to the invention with the roof removed to expose the farrowing crates therein;

FIG. 2 is a top plan view of another hog farrowing building according to the invention, also with the roof removed to expose the farrowing crates therein;

FIG. 3 is an enlarged top plan view of a farrowing crate according to the invention;

FIG. 4 is a side partially sectional view of the farrowing crate as seen on line 4—4 in FIG. 3;

FIG. 5 is a rear sectional view of the farrowing crate taken along line 5—5 in FIG. 4;

FIG. 6 is an enlarged perspective view of the feed through and lower end of the feed tube of the invention; and FIG. 7 is a sectional view of the feed trough taken along line 7—7 in FIG. 6.

DESCRIPTION OF THE PREFERRED EMBODIMENT

A hog farrowing building 10 is shown in FIG. 1 as including a rectangular housing 12 having a floor 14, sidewalls 16 and 18 and end walls 20 and 22. Several farrowing crates 24 are arranged on floor 14 in side-by-side relationship with their respective forward ends 26 in substantial abutting relation to housing sidewall 16. An elongated aisle way 28 extends through the housing 12 transverse to the crates along the rearward ends thereof.

Aisle way 28 is used to provide access to the rearward ends of the crates for cleaning purposes as well as to provide for the entrance and exit of a hog, indicated at 30, from each of the crates 24. Feeding of the hogs within the crates 24 can also be accomplished from aisle way 28 due to the provision of the respective feed tubes, indicated generally at 32 and described in greater detail below.

Another hog farrowing building indicated generally at 11, is shown in FIG. 2. Building 11 is similar to the hog farrowing building 10 shown in FIG. 1 so like reference numerals are used to refer to like parts of each. In building 11 of FIG. 2, sidewalls 16 and 18 are spaced further apart to accommodate a second row of crates 24 having their forward ends 26 in substantial abutting relation to the other housing sidewall 18. The single aisle way 28 thus provides access to the rearward ends of both rows of crates.

Referring to FIG. 3, a rectangular farrowing crate, indicated generally at 24, is shown having a forward end 26, a rearward end 34 and opposite sides 36 and 38. The crates 24 are substantially of tubular construction. Referring to FIG. 5, forward end 26 is shown as an inverted U-shaped tubular frame member 40 which rests on the floor 14 and has a section of wire fence material 42 extended between the opposite sides thereof. Rearward end 34 likewise includes an inverted U-shaped frame member 44 having a gate section 46 extended thereacross to confine a hog within the crate and yet be opened to provide for the entrance and exit of the hog. Sides 36 and 38 include a plurality of horizontally extended and vertically spaced apart tubes 48 and 50 respectively which are secured at their opposite ends to the inverted U-shaped frames 40 and 44. Each crate 24 additionally includes a roof structure including a pair of tubes 52 extended longitudinally of the crate between frames 40 and 44 with several cross member 56 interconnecting the roof tubes 52 to obstruct a sow from climbing out of the crate.

Floor 14 may be provided with a gutter 58 extended transversely of the crates 24 across the rearward ends thereof to facilitate the removal of waste. A slatted floor section 60 covers the gutters 58. It is understood that the crates may otherwise be situated over pits, flush gutters or mechanical or other manure removal systems.

Water for the sows within the crates 24 may be provided by an automatic watering apparatus 62 which extend through the forward end 26 of the crate and is connected to a central plumbing system of the building so as to provide a continuous source of water for the hogs which does not require regular filling. Such apparatus are well known and commercially available.

Feed for a sow within the crate 24 is deposited into a feed trough 64 situated adjacent the forward end 26 of the crate adjacent side 36. Access to feed trough 64 is provided by an elongated hollow tube 32 which is arranged on the side 36 of the crate and extends from an upper end 66 adjacent the rearward end 34 of the crate to a lower end 68 adjacent the forward end 26 of the crate.

Referring to FIGS. 6 and 7, it can be seen that the feed trough 64 is integrally formed with a hopper 70 situated above and to one side of the feed trough 64. The feed trough 64 is thus an open topped container consisting of a bottom wall 72, an upstanding end wall 74 and opposite sidewalls 76 and 78 which continue upwardly to define the sides of hopper 70. The hopper 70 is further defined by an upwardly and outwardly inclined bottom wall 80 and end walls 82 and 84. Since end wall 84 terminates above bottom wall 80, hop-70 is directly in communication with feed trough 64.

The lower end 68 of feed tube 32 is secured to the hopper 70 in communication with an opening 86 so that feed deposited in the upper end 66 of the tube will move by gravity through the feed tube 32, into the hopper 70 and to the feed trough 64. To facilitate the pouring of feed into the upper end 66 of the feed tube 32, a rearwardly and upwardly expanding funnel-like inlet portion 88 is provided as shown best in FIGS. 3 and 4. The open upper end 90 of inlet portion 88 is situated adjacent aisle way 28 so as to be conveniently accessible to a man standing in the aisle way.

Since feed tube 32 is inclined upwardly and rearwardly from the feed trough, no power source is required for conveying feed through the tube. Rather, feed flows through the tube 32 by gravity. For this purpose, the tube is constructed of a suitable shape and material to provide for the free flow of material therethrough. A generally cylindrical plastic tube inclined at an angle of between 32 and 50 degrees relative to the floor has been found to provide satisfactory flow.

Thus it can be seen that there has been provided a hog farrowing crate wherein access is required to only one end both for cleaning and feeding purposes. Accordingly, these crates may be arranged in substantially abutting relation against the sidewalls of a hog farrowing building with only a single access aisle extended between the rearward ends of oppositely facing crates for maximum space utilization. Thus it can be seen that the hog farrowing crate and building described above accomplishes at least all of the stated objects.

I claim:

1. A hog farrowing apparatus, comprising,
   an elongated rectangular crate having forward and rearward ends and elongated opposite sides,
   means for opening and closing said rearward end to provide for the entrance of a sow therein with its head positioned toward said forward end,
   said opposite sides being sufficiently closely spaced to prevent turning movement of a sow therein to a position with its head disposed toward said rearward end,
   an elongated hollow feed tube outside of said crate and on one side of said crate and extending from an upper end adjacent said rearward end of said crate to a lower end adjacent said forward end of said crate, and
   a feed trough adjacent said forward end of said crate and in communication with the lower end of said feed tube whereby feed deposited in the upper end of said feed tube outside of said create and will move by gravity to said feed trough.

2. The farrowing apparatus of claim 1 wherein said feed tube is straight.

3. The farrowing apparatus of claim 1 wherein said feed trough is located inside said crate.

4. The farrowing apparatus of claim 3 wherein said feed trough is located in a corner of said crate adjacent the forward end and one side thereof.

5. The farrowing apparatus of claim 3 wherein said lower end of the feed tube is in communication with a hopper outside said crate which is in communication with said feed trough.

6. The farrowing crate of claim 5 wherein said hopper is located above said feed trough.

7. The farrowing crate of claim 1 wherein said feed tube is inclined upwardly and rearwardly from said lower end at an angle of at least 30°.

8. The farrowing crate of claim 1 wherein said upper end of the feed tube includes a rearwardly extended and upwardly expanding inlet portion.

9. A hog farrowing building, comprising,
a rectangular housing having a floor, sidewalls and end walls,
a plurality of elongated rectangular crates having forward and rearward ends, and opposite sides resting on said floor in side-by-side relationship with their respective forward ends being in substantial abutting relation to one of the sidewalls of said housing,
an elongated aisle way extending through said housing transverse to said crates along the rearward ends thereof,
means for opening and closing said rearward end of each crate to provide for the entrance of a sow therein from said aisle way with its head positioned toward said forward end,
said opposite sides of each crate being sufficiently close together to prevent turning movement of a sow therebetween to a position with is head disposed toward said rearward end, and
a plurality of said crates each including an elongated hollow feed tube outside of said crate and on one side of said crate and extending from an upper end adjacent said rearward end of said crate to a lower end adjacent said forward end of said crate and a feed trough adjacent said forward end of said crate and in communication with the lower end of said feed tube whereby feed deposited in the upper end of said feed tube will move by gravity to said feed trough.

10. The hog farrowing building of claim 9 further comprising a plurality of rectangular crates having forward and rearward ends and opposite sides resting on said floor in side-by-side relationship with their respective forward ends being in substantial abutting relation to the other sidewall.

11. The hog farrowing building of claim 10 wherein said aisle way extends through said housing between the crates abutting said one sidewall and the crates abutting said other sidewall.

12. The hog farrowing building of claim 9 wherein said upper ends of said feed tubes are situated and open toward said aisle way.

* * * * *